(12) United States Patent
Ghiya et al.

(10) Patent No.: US 7,257,809 B2
(45) Date of Patent: Aug. 14, 2007

(54) ESTIMATION OF TYPE-CAST SETS

(75) Inventors: Rakesh Ghiya, Santa Clara, CA (US); David C. Sehr, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 839 days.

(21) Appl. No.: 10/331,782

(22) Filed: Dec. 31, 2002

(65) Prior Publication Data

US 2004/0128657 A1    Jul. 1, 2004

(51) Int. Cl.
*G06F 9/45* (2006.01)

(52) U.S. Cl. .................. 717/158; 717/151; 717/152; 717/153

(58) Field of Classification Search ............ 717/4–151; 719/315
See application file for complete search history.

(56) References Cited

U.S. PATENT DOCUMENTS

| | | | |
|---|---|---|---|
| 6,578,090 B1 * | 6/2003 | Motoyama et al. | 719/315 |
| 2002/0010911 A1 * | 1/2002 | Cheng et al. | 717/4 |
| 2002/0062476 A1 * | 5/2002 | Saxe et al. | 717/126 |
| 2002/0112225 A1 * | 8/2002 | Charisius et al. | 717/125 |
| 2003/0237077 A1 * | 12/2003 | Ghiya et al. | 717/151 |
| 2005/0149914 A1 * | 7/2005 | Krapf et al. | 717/136 |

* cited by examiner

*Primary Examiner*—Meng-Al T. An
*Assistant Examiner*—Mark P. Francis
(74) *Attorney, Agent, or Firm*—Sanjay S. Gadkari

(57) ABSTRACT

An arrangement is provided for estimating type-cast sets of a program. Type-cast sets of a program are computed with respect to the declared types contained in the program.

20 Claims, 9 Drawing Sheets

ESTIMATION OF TYPE-CAST SETS

BACKGROUND

Many software applications are written in weakly-typed languages such as C and C++. In such applications, there are often pervasive uses of pointers and pointer-based dynamic data structures. Programs written in those languages are often optimized to, for example, exploit instruction level parallelism or data locality for efficient memory access. The effectiveness of such optimization schemes depends substantially on the ability of the compiler to disambiguate pointer-based memory references accurately and to recognize the type-cast relationships among structures.

A major impediment to disambiguation of memory references in C or C++ is their weak type system. This is particularly attributed to type-casts. Due to type-casting, pointer de-references can not be safely disambiguated according to the declared types of the underlying pointers. Similarly, type-casting also hinders compiler optimizations that rely on modification to the signature of user-defined structure types. For example, data locality may be optimized to enhance memory performance through field re-ordering, structure splitting, and N-bit pointer identification. However, any structure that is type-cast to another structure can not be safely split and vice versa.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar parts throughout the several views of the drawings, and wherein:

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
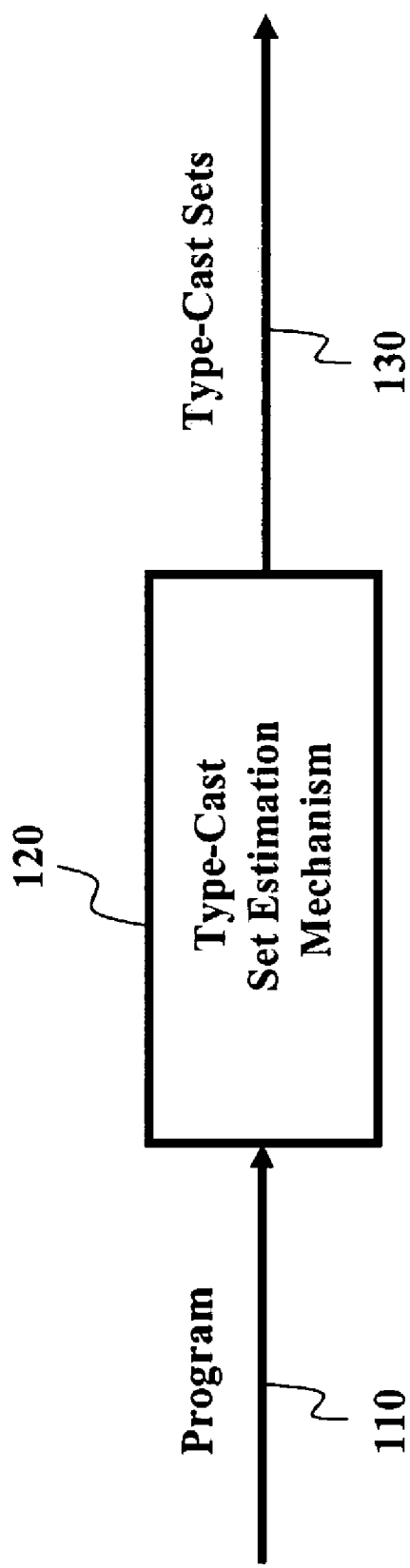
FIG. 1 depicts a type-cast set estimation mechanism that takes a program as input and computes the type-cast sets of declared types in the program, according to embodiments of the present invention.

FIG. 1 depicts a type-cast set estimation mechanism 120 that takes a program 110 as input and computes the type-cast sets of the program 10, according to embodiments of the present invention. The program 10 may be coded in a source language that is a weakly-typed (or non-type-safe) programming language such as C, C++, Borland C, or C#. The type-cast set estimation mechanism 120 processes the program 110, computing a type-cast set for each declared type to produce type-cast sets 130.

To estimate the type-cast sets 130 for declared types, the type-cast set estimation mechanism 120 identifies assignment statements in the program 110 and computes, for each such identified assignment statement, the type-cast sets 130 associated with the assignment statement. An assignment statement comprises a left hand side expression and a right hand side expression. For instance, in the assignment statement "X:=Y;", X is the left hand side expression, denoted by "lhs", and Y is the right hand side expression, denoted by "rhs".

Based on the left hand side expression and right hand sideright hand side expression of an assignment statement, the type-cast set estimation mechanism 120 first computes a types-represented set for both the left hand side expression and the right hand side expression. The derived types-represented set for the left hand side expression is denoted by TR(lhs) and the derived types-represented set for the right hand side expression is denoted by TR(rhs). Both TR(lhs) and TR(rhs) may contain a plurality of elements. That is, |TR(lhs)|≧1 and |TR(rhs)|≧1. Details about how a types-represented set of an expression (either from the left hand side or from the right hand side) are discussed with reference to FIGS. 3 and 5.

Type-cast sets relevant to an identified assignment statement are computed as follows. For each element in TR(lhs), $l_i \in TR(lhs)$ and $1 \leq i \leq |TR(lhs)|$, a type-cast set is computed as a union between the type-cast set of $l_i$, denoted as $TC(l_i)$, and the type-cast sets of all the elements in TR(rhs). That is, $TC(l_i) = TC(l_i) \cup TC(r_j)$, where $r_j \in TR(rhs)$ and $1 \leq j \leq |TR(rhs)|$. Therefore, for an assignment statement with a left hand side expression lhs and a right hand side expression rhs, a total of |TR(lhs)| type-cast sets are computed.

Figure 2:
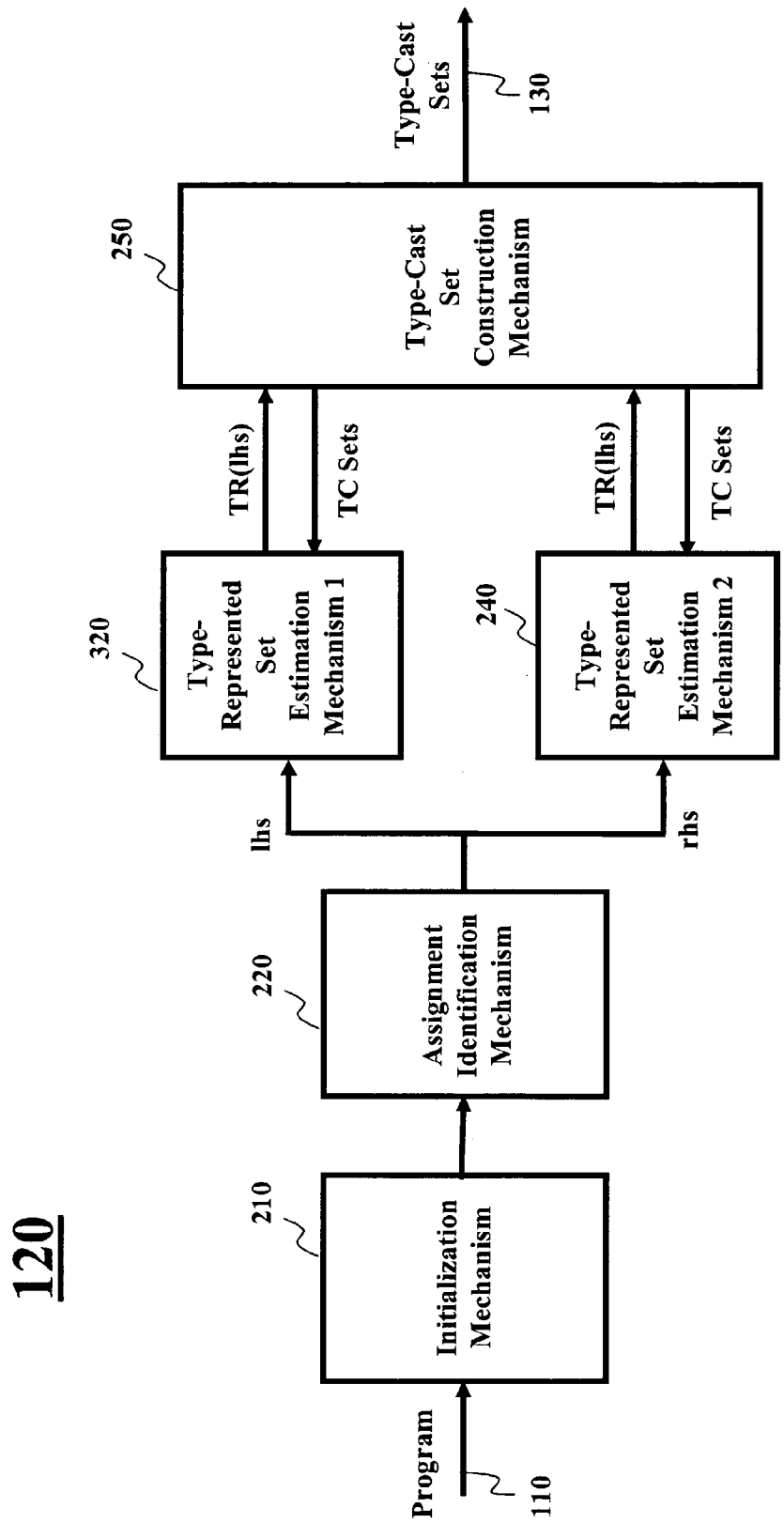
FIG. 2 depicts an exemplary internal structure of a type-cast set estimation mechanism, according to embodiments of the present invention.

FIG. 2 depicts an exemplary internal structure of the type-cast set estimation mechanism 120, according to embodiments of the present invention. The type-cast set estimation mechanism 120 comprises an initialization mechanism 210, an assignment identification mechanism 220, a types-represented set estimation mechanism 1 230, a types-represented set estimation mechanism 2 240, and a type-cast set construction mechanism 250. In this illustrated embodiment, the initialization mechanism 210 is responsible for initializing the type-cast sets 130 for all declared types contained in the program 110. For instance, for each declared type $T_k$, the initialization mechanism 210 may set the initial value of the type-cast set of $T_k$ to be $TC(T_k)=\{T_k\}$.

An initial type-cast set may get expanded during the process of computing type-cast sets 130 of the program 110. How this set is expanded depends on the specific content in the program 110. Elements are added to the set due to, for instance, type-casts. As an example, if variable X has a type DType(X) (the data type of variable X), its initial type-cast set is then TC(DType(X))={DType(X)}. If there is a type-cast in the program 110 associated with variable X such as "X:=(DType(X)) Y;", then the initial type-cast set TC(D-Type(X)) will be expanded to include one more element DType(Y). That is, the expanded type-cast set becomes TC(DType(X))={DType(X), DType(Y)}.

After the type-cast sets for all the declared types are initialized, the assignment identification mechanism 220 identifies the assignment statements in the program 110. The computation for the type-cast sets of the program 110 is then performed based on such identified assignment statements. The identified assignments may include both explicit and implicit assignments. Implicit assignments usually occur in a function call. When a function is called, formal parameters (if any) are substituted by actual parameters. Such substitutions are implicit assignments.

For each assignment statement, the left hand side expression lhs and the right hand side expression rhs are identified. A types-represented set for each is computed. In FIG. 2, there are two types-represented set estimation mechanisms, 230 and 240, one of which computes the types-represented set TR(lhs) for the left hand side expression and the other computes the types-represented set TR(rhs) for the right hand side expression. With two separate mechanisms, the computation of TR(lhs) and TR(rhs) may be carried out in parallel. Alternatively, one type-represented set estimation mechanism may be adequate so that computation of TR(lhs) and TR(rhs) are carried out sequentially.

Based on TR(lhs) and TR(rhs), the type-cast set construction mechanism 250 constructs a type-cast set for each element in TR(lhs) according to the computation described above. That is, it computes $TC(l_i)=TC(l_i)\cup TC(r_j)$, where $l_i \in TR(lhs)$ for $1 \leq i \leq |TR(lhs)|$ and $r_j \in TR(rhs)$ for $1 \leq j \leq |TR(rhs)|$.

A types-represented set of an expression is computed according to the format of the expression. Different formats lead to different computations to derive an underlying types-represented set. For example, if an expression is in the form of p (simple variable), its types-represented set is simply the type-cast set of the declared type of variable p. That is, TR(p)=TC(DType(p)).

If an expression is in the form of *p or a type after applying one level of indirection of the declared type p, the types-represented set of *p is computed as a union: $TR(*p)=TR(*p) \cup TC(*t_i)$, where $t_i \in TC(DType(p))$ and $*t_i$ is a type obtained after applying one level of indirection on the declared type $t_i$. The union operation is applied for each i such that $1 \leq i \leq |TC(Dtype(p))|$.

If an expression is in the form of &p or a type obtained by applying one level of addressing on the declared type p, the types-represented set of &p is computed as a different union: $TR(\&p)=TR(\&p) \cup TC(t_i^*)$, where $t_i \in TC(DType(p))$ and $t_i^*$ is a type obtained by applying one level of addressing on the declared type $t_i$. The union operation is applied for each i such that $1 \leq i \leq |TC(Dtype(p))|$.

When an expression is in the form of (*p).f, wherein f is a field of a structure pointed at by (*p), the types-represented set of (*p).f is computed as yet another different union: $TR((*p).f)=TR((*p).f) \cup TC(t_i.f)$, where $t_i \in TR(*p)$ and $1 \leq i \leq |TC(Dtype(p)Å$ (which can be computed as discussed above) and $t_i.f$ is the declared type of field f of type $t_i$ which is at the same offset as field f in Dtype(*p). This can be illustrated in the following example.

struct foo {lilt foo1; int foo2; };
  struct bar {mt goo1; int goo2; };

Using this example, assume t is a type corresponding to struct bar and f is a type corresponding to field foo1 in struct foo. Field foo1 in struct foo has a certain offset. In this context, t.f then yields field goo1 because it is the field in struct bar that has a same offset as foo1 in struct foo.

When an expression is in the form of a function call such as foo( ), the types-represented set of foo( ) is computed as: TR(foo( ))=TC (DType(return_foo( ))). That is, the types-represented set of a function call is the types-cast set of the return type of the function. For example, if a function returns a value of integer type, its return type is declared type "integer".

When an expression is in the form of &foo, the types-represented set of &foo is computed as: TR(&foo)=TC (Type signature of function foo), wherein the type signature of a function is defined as a union between the return type of the function and the types of all the incoming parameters to the function.

There may be special categories of assignment statements that may require special consideration. As an illustration, the return type of a memory allocation function may be considered the same as the declared type of the corresponding left hand side expression. For example, given an assignment statement involving memory allocation such as "X:= malloc( );", the return type of function "malloc" may be treated as the declared type of X. Such a treatment may be intended to avoid the introduction of a "void" type (to keep the type-cast set smaller). Alternative treatments are also possible.

Figure 3:
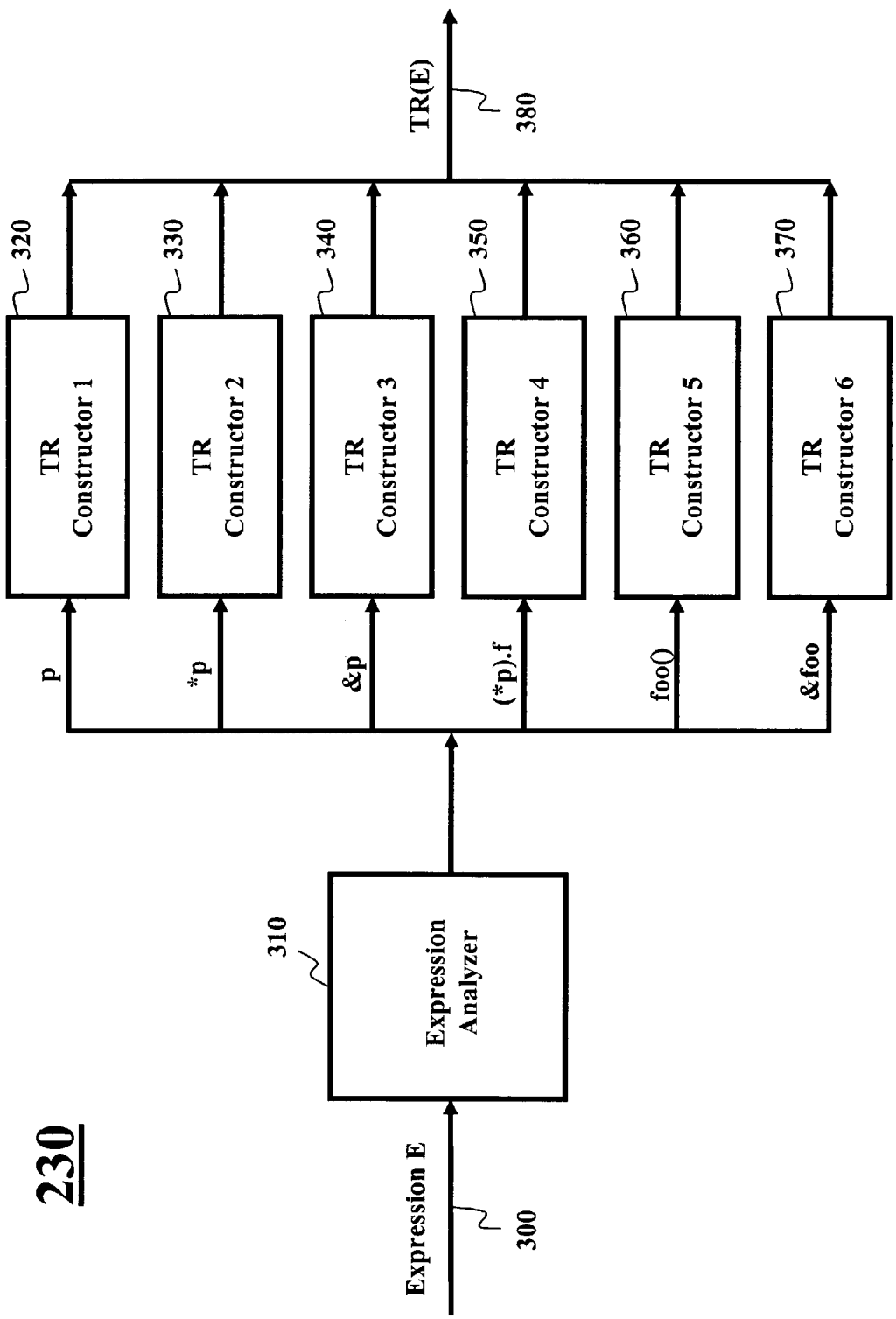
FIG. 3 depicts an exemplary internal structure of a types-represented set estimation mechanism, according to embodiments of the present invention.

FIG. 3 depicts an exemplary internal structure of a types-represented set estimation mechanism (e.g., 230), according to embodiments of the present invention. The types-represented set estimation mechanism 230 takes an expression 300 (either lhs or rhs expression of an assignment) as input and produces a types-represented (TR) set 380 for the expression as its output. The types-represented set estimation mechanism 230 comprises an expression analyzer 310 and a plurality of types-represented set constructors (TR constructor 1 320, TR constructor 2 330, TR constructor 3 340, TR constructor 4 350, TR constructor 5 360, and TR constructor 6 370).

Each of the TR constructors is responsible for generating the types-represented set 380 for the expression 300 in a particular format. For instance, the TR constructor 1 320 may be responsible for constructing the TR set 380 for an expression that is in the form of p (the simplest case). The TR constructor 2 330 may be responsible for constructing the TR set 380 for an expression that is in the form of *p. The TR constructor 3 340 may be responsible for constructing the TR set 380 for an expression that is in the form of &p. The TR constructor 4 350 may be responsible for constructing the TR set 380 for an expression that is in the form of (*p).f. The TR constructor 5 360 may be responsible for constructing the TR set 380 for an expression that is in the form of foo( ). The TR constructor 6 370 may be responsible for constructing the TR set 380 for an expression that is in the form of &foo.

Figure 4:
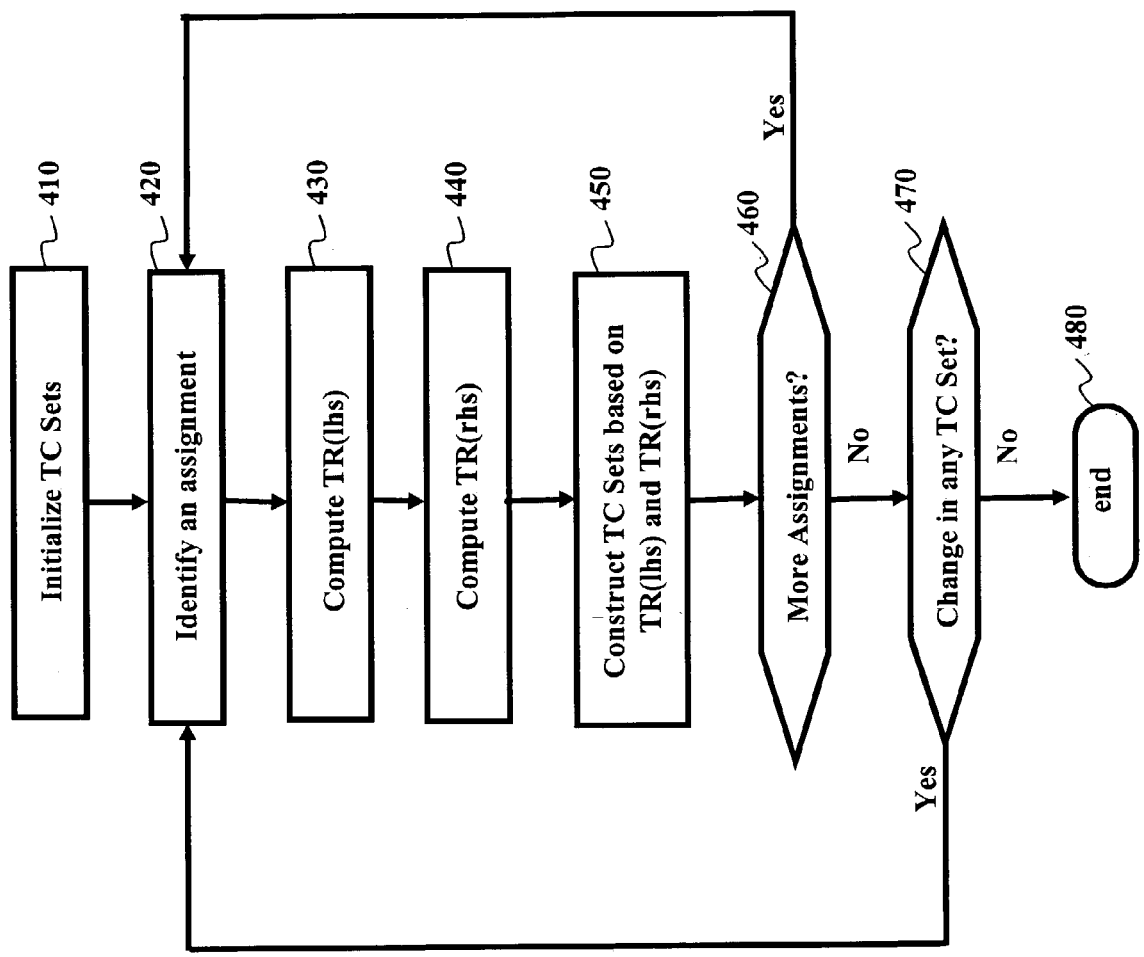
FIG. 4 is a flowchart of an exemplary process, in which a type-cast set estimation mechanism computes the type-cast sets of declared types of a program, according to embodiments of the present invention.

FIG. 4 is a flowchart of an exemplary process, in which the type-cast set estimation mechanism 120 computes the type-cast sets 130 of the declared types of a program, according to embodiments of the present invention. Type-cast sets for all declared types in the program 110 are first initialized at act 410. An assignment statement is identified at act 420. For such an identified assignment, the types-represented sets for its left hand side and right hand side expressions, TR(lhs) and TR(rhs), are computed at acts 430 and 440, respectively. Detailed flow related to computing a types-represented set is described with reference to FIG. 5.

Based on the computed TR(lhs) and TR(rhs), the type-cast sets for each of the elements within TR(lhs) are constructed at act 450. This construction is performed using the formula described above. The type-cast set computation continues from assignment to assignment until all the assignments in the program are enumerated, determined at act 460. This constitutes one iteration of the computation. The iterative processing continues until none of the type-cast sets is changed during an iteration, determined at act 470. When all the type-cast sets are stable, the processing ends at act 480.

Figure 5:
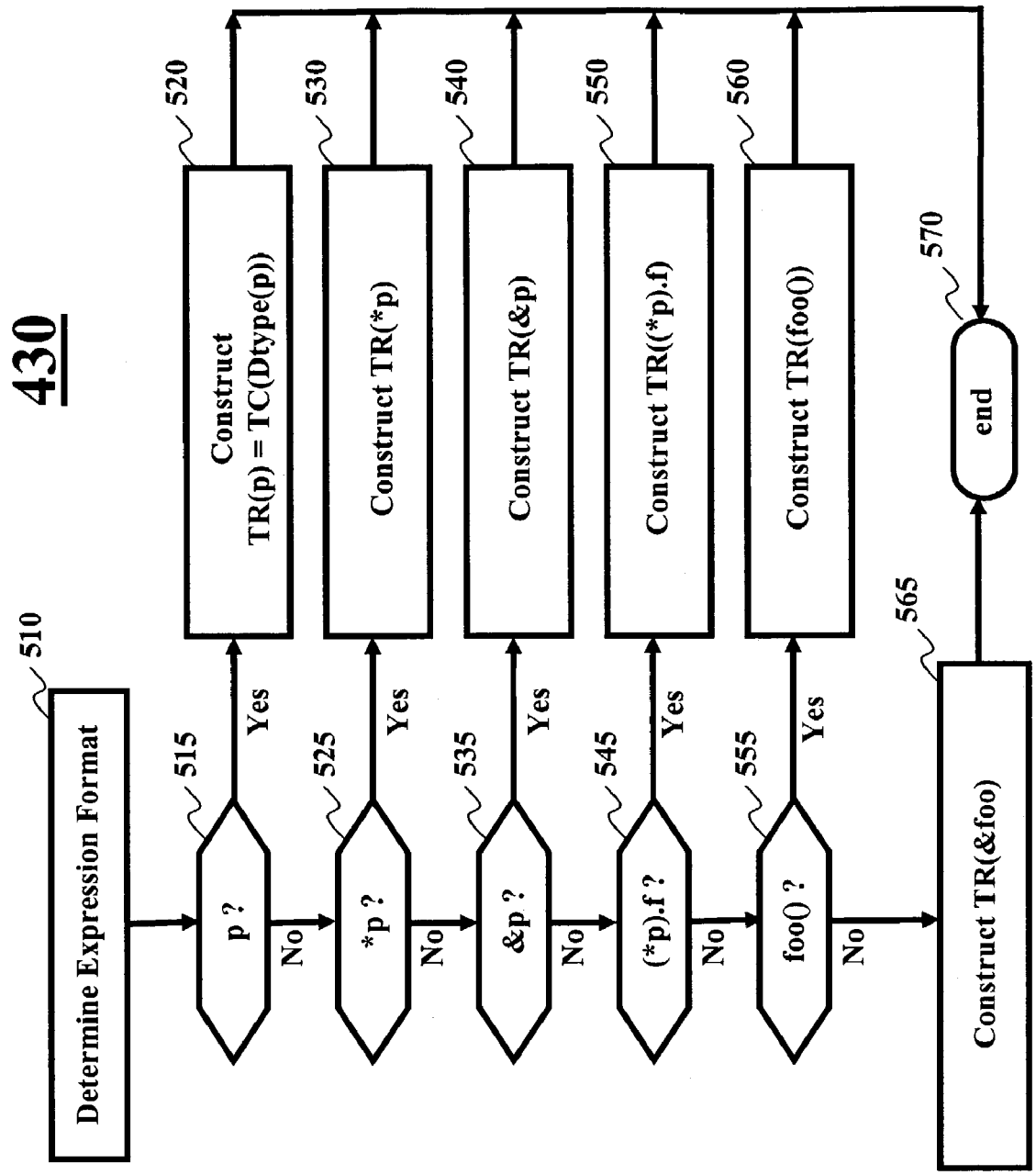
FIG. 5 is a flowchart of an exemplary process, in which a types-represented set for an expression is computed, according to embodiments of the present invention.

FIG. 5 is a flowchart of an exemplary process, in which a types-represented set for an expression is computed, according to embodiments of the present invention. To estimate the TR set for a given expression (either the lhs expression or the rhs expression of an assignment), the format of the expression is first determined at act 510. If the expression is in the form of p, determined at act 515, TR(p)=TC(Dtype(p)) is computed at act 520. If the expression is in the form of *p, determined at act 525, TR(*p)= TR(*p)∪TC(*t) is computed at act 530.

If the expression is in the form of &p, determined at act 535, TR(&p)=TR(&p)∪TC(t*) is computed at act 540. If the expression is in the form of (*p).f, determined at act 545, TR((*p).f)=TR((*p).f)∪TC(t.f) is computed at act 550. If the expression is in the form of foo( ), determined at act 555, TR(foo( ))=TR(foo( ))∪TC(Dtype(return_foo( ))) is computed at act 560. If the expression is in the form of &foo, TR(&foo)={type signature of function foo} is computed at act 565. After the TR for the expression is constructed, the process ends at act 570.

Figure 6:
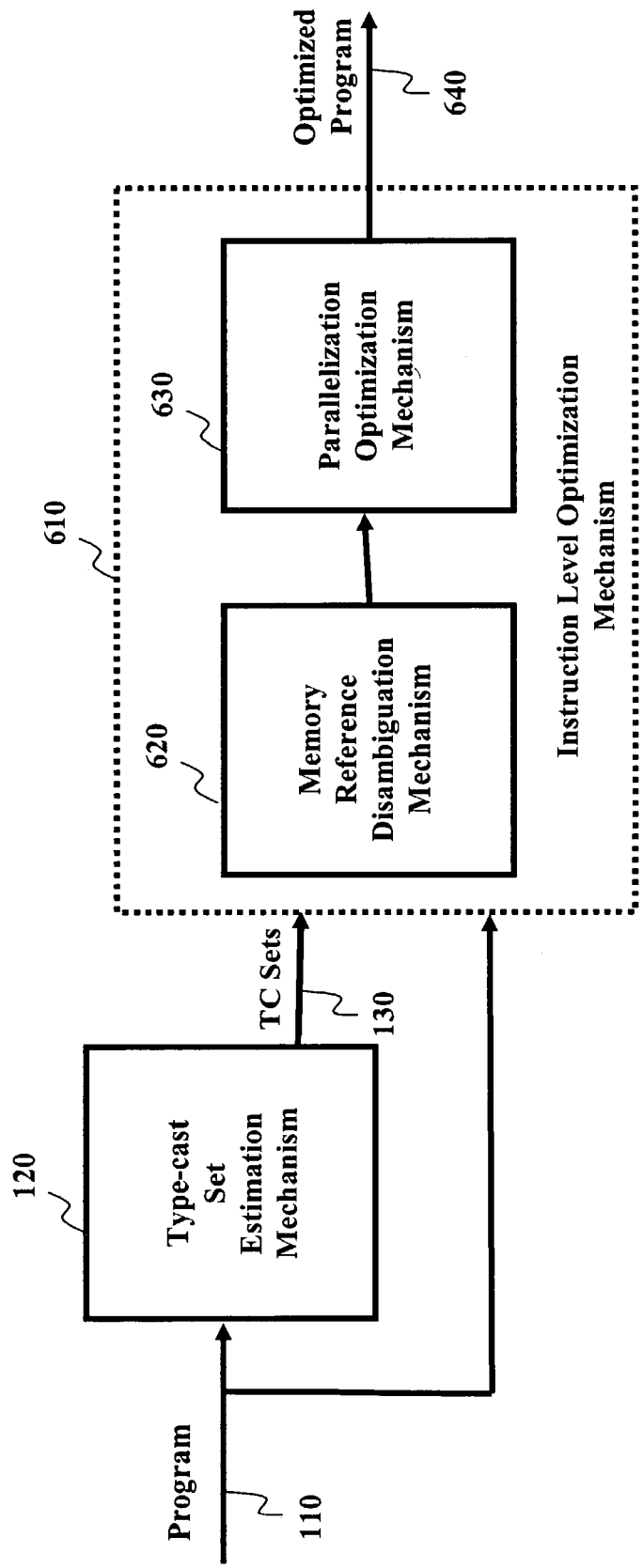
FIG. 6 depicts a framework 600, in which type-cast sets computed from a program are used to optimize instruction level parallelism of the program, according to embodiments of the present invention.

FIG. 6 depicts a framework 600, in which type-cast sets 130 computed from a program are used to optimize instruction level parallelism of the program, according to embodiments of the present invention. The framework 600 comprises the type-cast set estimation mechanism 120 and an instruction level optimization mechanism 610. The type-cast set estimation mechanism 120 takes a program 110 as its input and computes the type-cast sets 130 for all the declared types in the program 110. The instruction level optimization mechanism 610 is to optimize a program 110 at its instruction level to maximize the inherent parallelism within the program 110.

The instruction level optimization mechanism 610 comprises a memory reference disambiguation mechanism 620 and a parallelism optimization mechanism 630. The memory disambiguation mechanism 620 is responsible for disambiguating memory references (or de-references) using the type-cast sets 130 computed by the type-cast set estimation mechanism 120.

With the type-cast sets 130, the memory disambiguation mechanism 620 can disambiguate different memory references by evaluating whether their corresponding type-cast sets intersect. If their type-cast sets intersect, the underlying memory references are not disjoint and hence their memory references have overlap. The following example illustrates the point:

```
struct foo {int f; int ff; };
struct bar {int g; int gg; };
struct car {int h; int hh; };
main( ) {
    int x, *pB; float y, *qB;
    struct foo *oB;
    struct bar *mB, s;
    struct cat *nB, t;
    pB := &x;
    qB := &y;
S:  pB := (int *) qB;
T:  *pB := 5;
U:  *qB := 6;
    mB := &s;
V:  oB := (struct foo *) mB;
W:  oB → f := 6;
    nB := &t;
X:  nB → h := 7;
}
```

Based on this example, we consider disambiguating the memory reference *pB at statement T from the reference *qB at statement U. Due to the type-cast at statement S, we have
TC(Dtype(pB))=TC(int*)={int*, float*}, and
TC(Dtype(qB))=TC(float*)={float*}

Therefore, the two memory references *pB and *qB overlap.

As another illustration, consider references oB→f (at statement W) and nB→h (at statement X) in the given example. In this case, due to the type-cast at statement V, we have
TC(Dtype(nB))=TC(car*)={car*}, and
TC(Dtype(oB))=TC(foo*)={foo*, bar*}

These two type-cast sets do not intersect and we can assume that the underlying memory references are disjoint. Therefore, using the type-cast sets 130, a rule can be used in disambiguating memory references: given any two memory references *ptrA and *ptrB, if TC(Dtype(ptrA))∩TC(Dtype (ptrB)) is empty, the two memory references do not overlap.

In the framework 600, using the type-cast sets 130 computed by the type-cast set estimation mechanism 120, the memory reference disambiguation mechanism 620 disambiguates memory references to facilitate the parallelism optimization mechanism 630 to exploit the inherent parallelism in the program 110. The parallelism optimization mechanism 630 optimizes the program 110 and generates optimized program 640.

Figure 7:
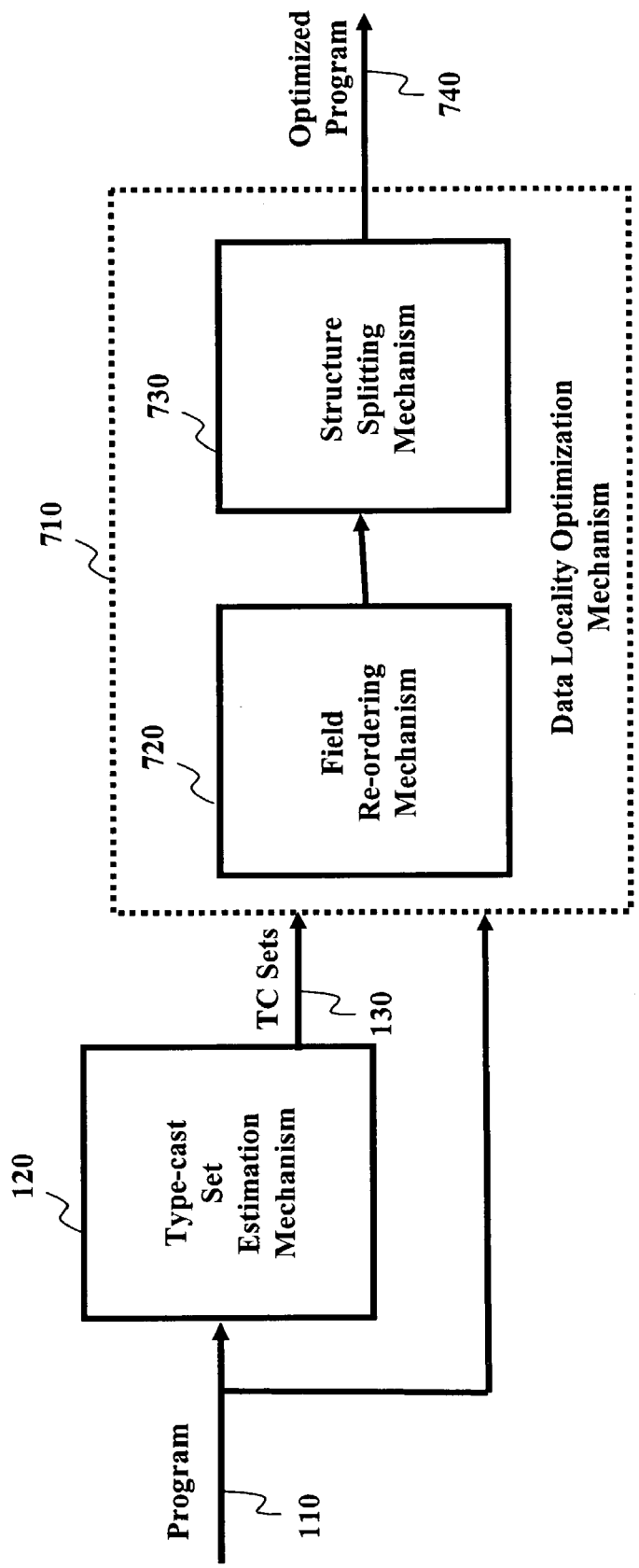
FIG. 7 depicts a different framework 700, in which type-cast sets computed from a program are used to optimize data locality of the program for efficient memory access, according to embodiments of the present invention.

FIG. 7 depicts a different framework 700, in which type-cast sets 130 computed from a program are used to optimize data locality of the program for efficient memory access, according to embodiments of the present invention. The framework 700 comprises the type-cast set estimation mechanism 120 and a data locality optimization mechanism 710. Similar to the application described above, the type-cast sets 130 computed by the type-cast set estimation mechanism 120 are utilized for optimization purposes.

In the framework 700, the data locality optimization mechanism 710 is responsible for changing the structure layout in the program 110 according to their memory access patterns to improve memory access efficiency. For example, fields may be re-ordered so that fields that are accessed frequently may be grouped together in memory and fields that are accessed infrequently may be grouped together. Based on such re-ordering, a structure in the program 110 may be split into more than one structures, each containing data that presents similar access patterns. In this way, each memory access may include more pieces of data that are likely to be accessed in the near future. With such improvement, it reduces cache misses, decreases memory accesses, and improves processing speed.

The data locality optimization mechanism 710 comprises a field re-ordering mechanism 720 and a structure splitting mechanism 730. The field re-ordering mechanism 720 is to re-order fields contained in structures according to their access pattern. To properly split a structure, it needs to be ensured that a structure that is to be split is not cast to any other structure and vice versa. The type-cast sets 130 computed from the program 110 provide information to determine whether a structure is cast to another or another structure is cast to it. The structure splitting mechanism 720 utilizes such type-cast set information to determine how the structures in the program 110 are to be split in order to optimize data locality.

Figure 8:
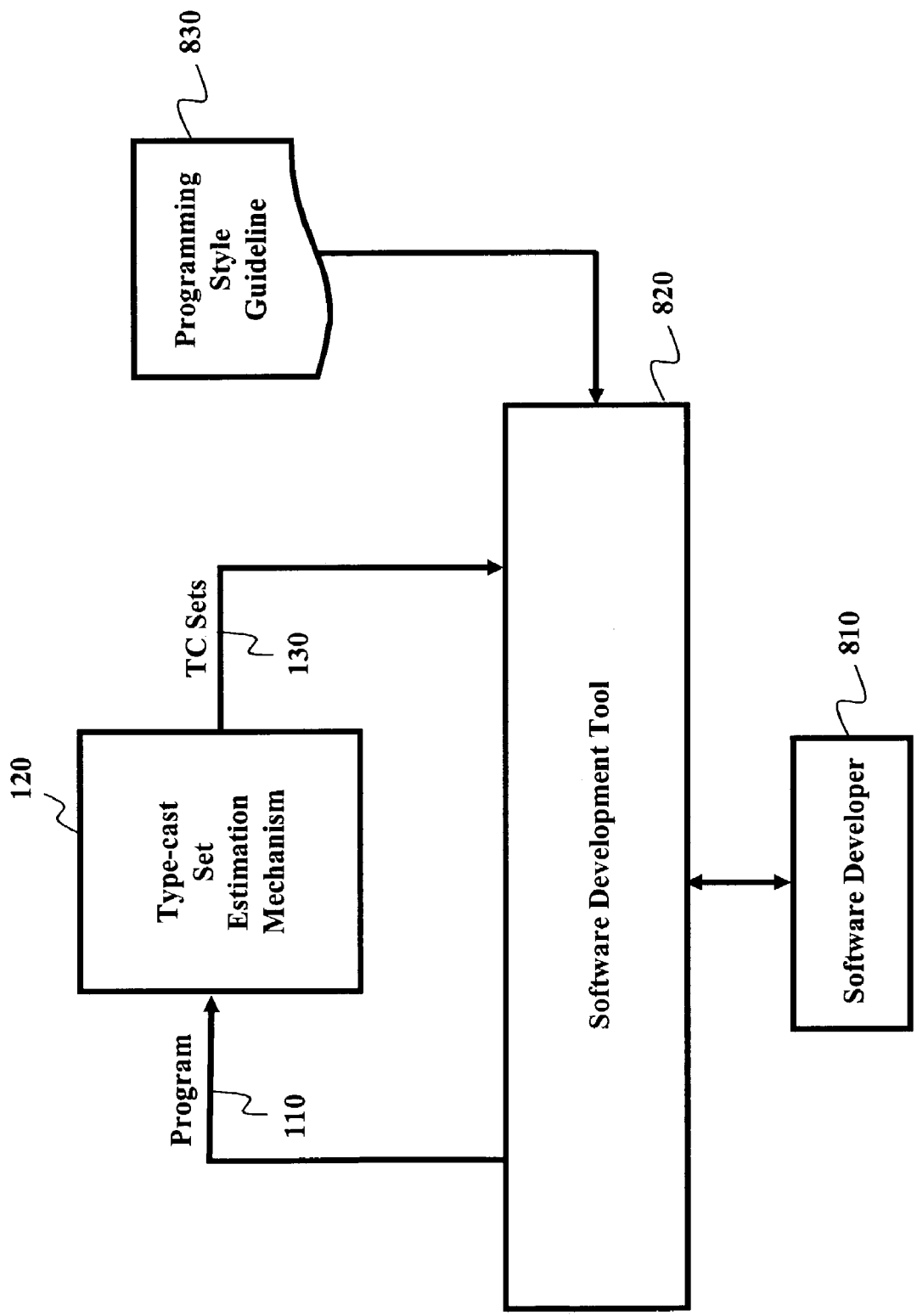
FIG. 8 depicts another framework 800, in which type-cast sets computed from a program are used to evaluate the validity of a program in development with respect to a pre-determined programming style guideline, according to embodiments of the present invention.

FIG. 8 depicts another framework 800, in which type-cast sets 130 computed from a program 110 are used to evaluate the validity of the program in development with respect to a pre-determined programming style guideline, according to embodiments of the present invention. In framework 800, a software developer 810 interacts with a software development tool 820 in the process of developing an application software. There is a pre-determined programming style guideline 830 that sets forth the principles to be applied in developing the application siftware. Such principles may include, for example, measures related to safe programming style that may prohibit certain programming practices such as type-cast between structures.

During the process of developing the application software, the software developer 810 may interactively develop the code using the software development tool 820. To ensure the quality of the developed code according to the programming style guideline 830, the software development tool 820 may send the developed code to the type-cast set estimation mechanism 120 which subsequently computes the type-cast sets for all the types declared so far in the software. The type-cast sets thus computed are then used by the software development tool 820 to compare with the programming style guideline 820 to determine whether any portion of the developed code violates the guideline 820.

When a violation is detected, the software development tool 820 may react accordingly. For example, if it is during the development stage, the software development tool 820 may inform the software developer 810 of such detected violation and request the developer to change the code. For example, based on information contained in the type-cast sets 130, the software development tool 820 may point out to the developer 810 that a particular new field can not be safely added to a structure.

If it is during the application integration stage, the software development tool 820 may reject a program with such a violation and refuse to allow the developed code to be integrated with other parts of the underlying application software. If it is at the debugging stage, the software development tool 820 may use type-cast sets to detect potential errors in a particular program.

Figure 9:
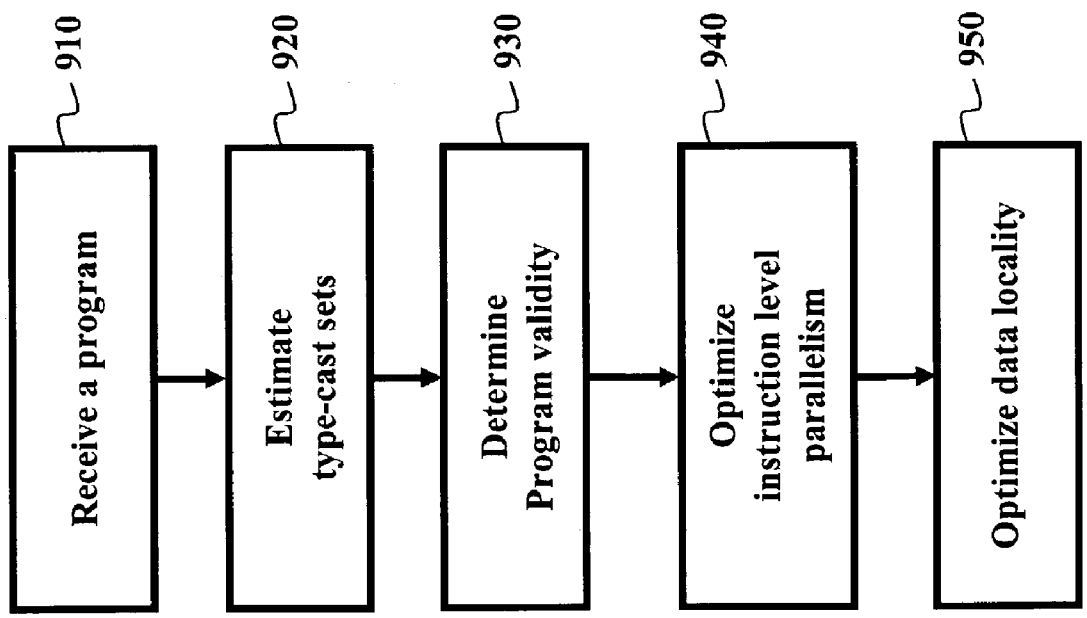
FIG. 9 is a flowchart of an exemplary process, in which type-cast sets computed from a program are utilized in different tasks, according to embodiments of the present invention.

FIG. 9 is a flowchart of an exemplary process, in which type-cast sets 130 computed from a program are used for different tasks, according to embodiments of the present invention. A program is first received at act 910. Based on the program, its type-cast sets are computed at act 920. Such computed type-cast sets may be used, at act 930, to determine the validity of the underlying program (as described with reference to FIG. 8). The computed type-cast sets may also be utilized, at act 940, to disambiguate memory references in optimizing the program to exploit instruction level parallelism (as described with reference to FIG. 6). Furthermore, the computed type-cast sets may also be utilized, at act 940, to examine whether different structures are type-cast in order to determine whether such structures may be split safely for data locality optimization.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method, comprising:
receiving a program;
estimating type-cast sets of the program, wherein each of the type-cast sets corresponds to a declared type in the program, wherein the estimating type-cast sets further comprises
initializing type-cast sets for corresponding declared types in the program;
identifying an assigment statement in the program, wherein the assignment statement includes a left hand side expression and a right hand side expression;
computing types-represented sets for both the left hand side expression and the right hand side expression of the assignment statement; and
constructing a type-cast set for each element in the types-represented set of the left hand side expression based on the types-represented sets of the left hand side expression and the right hand side expression; and
determining the validity of the program that is being developed with respect to a pre-determined programming style guideline using the type-cast sets computed from the program.

2. The method according to claim 1, further comprising optimizing the program using the type-cast sets computed from the program.

3. The method according to claim 2, wherein said optimizing includes at least one of:
optimizing the program at the instruction level for instruction level parallelism; and
optimizing data locality of the program for efficient memory access.

4. A method for estimating type-cast sets of a program, comprising:
initializing type-cast sets corresponding to declared types in the program;
identifying an assigment statement in the program; and
estimating at least one type-cast set corresponding to the assignment statement, wherein said estimating comprises:

initializing type-cast sets for corresponding declared types in the program;

identifying an assigment statement in the program, wherein the assignment statement includes a left hand side expression and a right hand side expression;

computing types-represented sets for both left hand side expression and right hand side expression of the assignment statement; and constructing a type-cast set for each element in the types-represented set of the left hand side expression based on the types-represented sets of the left hand side expression and the right hand side expression; and determining the validity of the program that is being developed with respect to a pre-determined programming style guideline using the type-cast sets computed from the program.

5. The method according to claim 4, wherein said computing a types-represented set of an expression comprises:

determining the format of the expression;

constructing the types-represented set of the expression according to the format of the expression.

6. The method according to claim 5, wherein said constructing the types-represented set comprises:

if the format of the expression is in the form of p, computing the types-represented set of p as the type-cast set of the declared type of p;

if the format of the expression is in the form of *p, computing the types-represented set of *p as a union between the types-represented set of *p with every type-cast set of *T, wherein T is an element contained in the type-cast set of declared type p and *T is the type obtained after applying one level of indirection on declared type T;

if the format of the expression is in the form of &p, computing the types-represented set of &p as a union between the types-represented set of &p with every type-cast set of T*, wherein T is an element contained in the type-cast set of declared type p and T* is the type obtained after applying one level of addressing on declared type T;

if the format of the expression is in the form of(*p).f, computing the types-represented set of (*p).f as a union between the types-represented set of (*p).f with every type-cast set of T.f, wherein T is an element contained in the types-represented set of *p and T.f is the declared type of the field f of type T;

if the format of the expression is in the form of a funtion call foo( ), computing the types-represented set of the function call foo( ) as the type-cast set of the declared type of the return type of the function call foo( ); and if the format of the expression is in the form of an address of a function call &foo, computing the types-represented set of &foo( ) as the type signature of the function foo.

7. The method according to claim 4, wherein said constructing a type-cast set for an element contained in the types-represented set of the left hand side expression comprises:

computing the type-cast set of the element as a union between the type-cast set of the element and the type-cast sets for all the elements contained in the types-represented set for the right hand side expression of the assignment statement.

8. A system having processor, comprising:

a program;

a type-cast set estimation mechanism for estimating type-cast sets of the program, wherein each of the type-cast sets corresponds to a declared type in the program, wherein the type-cast set estimation mechanism comprises:

an assignment statement identification mechanism for identifying an assigment statement in the program, wherein the identified assignment statement includes a left hand side expression and a right hand side expression;

a types-represented set estimation mechanism for computing types-represented sets for both the left hand side expression and the right hand side expression; and a type-cast set construction mechanism for constructing a type-cast set for each element in the types-represented set of the left hand side expression based on the types-represented sets of the left hand side expression and the right hand side expression; and an application development tool for evaluating the validity of the program that is being developed with respect to a pre-determined programming style guideline based on the type-cast sets computed from the program.

9. The system according to claim 8, further comprising an optimization mechanism capable of optimizing the program based on the type-cast sets computed from the program to produce an optimized program.

10. The system according to claim 9, wherein the optimization mechanism includes at least one of:

an instruction level parallelism optimization mechanism capable of optimizing at the instruction level for instruction level parallelism; and a data locality optimization mechanism capable of optimizing data locality for efficient memory access.

11. A system having processor for estimating type-cast sets of a program, comprising:

an assignment statement identification mechanism capable of identifying an assigment statement in a program, wherein the identified assignment statement includes a left hand side expression and a right hand side expression;

a types-represented set estimation mechanism capable of computing types-represented sets for both the left hand side expression and the right hand side expression; and a type-cast set construction mechanism capable of constructing a type-cast set for each element in the types-represented set of the left hand side expression based on the types-represented sets of the left hand side expression and the right hand side expression, wherein the types-represented set estimation mechanism comprises:

an expression analyzer capable of determining the format of an expression; and a plurality of types-represented set constructors, each of which is for computing the types-represented set of the expression according to the format of the expression, and determining the validity of the program that is being developed with respect to a pre-determined programming style guideline using the type-cast sets computed from the program.

12. The system according to claim 11, wherein the plurality of types-represented set constructors include:

a first types-represented set constructor for computing, when the format of the expression is in the form of p, a types-represented set of p as the type-cast set of the declared type of p;

a second types-represented set constructor for computing, when the format of the expression is in the form of *p, a types-represented set of *p as a union between the types-represented set of *p with every type-cast set of *T, wherein T is an element contained in the type-cast set of declared type p and *T is the type obtained after applying one level of indirection on declared type T;

a third types-represented set constructor for computing, when the format of the expression is in the form of &p, a types-represented set of &p as a union between the types-represented set of &p with every type-cast set of T*, wherein T is an element contained in the type-cast set of declared type p and T* is the type obtained after applying one level of addressing on declared type T;

a fourth types-represented set constructor for computing, when the format of the expression is in the form of (*p).f, a types-represented set of (*p).f as a union between the types-represented set of (*p).f with every type-cast set of T.f, wherein T is an element contained in the types-represented set of *p and T.f is the declared type of the field f of type T;

a fifth types-represented set constructor for computing, when the format of the expression is in the form of a funtion call foo( ), a types-represented set of the function call foo( ) as the type-cast set of the declared type of the return type of the function call foo( ); and a sixth types-represented set constructor for computing, when the format of the expression is in the form of an address of a function call &foo, a types-represented set of &foo( ) as the type signature of the function foo.

13. The system according to claim 11, further comprising an initialization mechanism for initializing the type-cast sets of the program.

14. An article comprising a storage medium having stored thereon instructions that, when executed by a machine, result in the following:
receiving a program;
estimating type-cast sets of the program, wherein each of the type-cast sets corresponds to a declared type in the program wherein said estimating type-cast sets comprises:
  initializing type-cast sets for corresponding declared types in the program;
  identifying an assigment statement in the program, wherein the assignment statement includes a left hand side expression and a right hand side expression;
  computing types-represented sets for both the left hand side expression and the right hand side expression of the assignment statement; and
  constructing a type-cast set for each element in the types-represented set of the left hand side expression based on the types-represented sets of the left hand side expression and the right hand side expression; and
determining the validity of the program that is being developed with respect to a pre-determined programming style guideline using the type-cast sets computed from the program.

15. The article according to claim 14, the instruction, when executed by a machine, further result in optimizing the program using the type-cast sets computed from the program.

16. The article according to claim 15, wherein said optimizing includes at least one of:
optimizing the program at the instruction level for instruction level parallelism; and
optimizing data locality of the program for efficient memory access.

17. An article comprising a storage medium having stored thereon instructions for estimating type-cast sets of a program that, when executed by a machine, result in the following:

initializing type-cast sets corresponding to the declared types in the program;
identifying an assigment statement in the program; and
estimating at least one type-cast set corresponding to the assignment statement, wherein said estimating comprises:
  computing types-represented sets for both left hand side expression and right hand side expression of the assignment statement; and
  constructing a type-cast set for each element in the types-represented set of the left hand side expression based on the types-represented sets of the left hand side expression and the right hand side expression; and
determining the validity of the program that is being developed with respect to a pre-determined programming style guideline using the type-cast sets computed from the program.

18. The article according to claim 17, wherein said computing a types-represented set of an expression comprises:
determining the format of the expression;
constructing the types-represented set of the expression according to the format of the expression.

19. The article according to claim 18, wherein said constructing the types-represented set comprises:
if the format of the expression is in the form of p, computing the types-represented set of p as the type-cast set of the declared type of p;
if the format of the expression is in the form of *p, computing the types-represented set of *p as a union between the types-represented set of *p with every type-cast set of *T, wherein T is an element contained in the type-cast set of declared type p and *T is the type obtained after applying one level of indirection on declared type T;
if the format of the expression is in the form of &p, computing the types-represented set of &p as a union between the types-represented set of &p with every type-cast set of T*, wherein T is an element contained in the type-cast set of declared type p and T* is the type obtained after applying one level of addressing on declared type T;
if the format of the expression is in the form of(*p).f, computing the types-represented set of (*p).f as a union between the types-represented set of (*p).f with every type-cast set of T.f, wherein T is an element contained in the types-represented set of *p and T.f is the declared type of the field f of type T;
if the format of the expression is in the form of a funtion call foo( ), computing the types-represented set of the function call foo( ) as the type-cast set of the declared type of the return type of the function call foo( ); and
if the format of the expression is in the form of an address of a function call &foo, computing the types-represented set of &foo as the type signature of the function foo.

20. The article according to claim 17, wherein said constructing a type-cast set for an element contained in the types-represented set of the left hand side expression comprises:
computing the type-cast set of the element as a union between the type-cast set of the element and the type-cast sets for all the elements contained in the types-represented set for the right hand side expression of the assignment statement.

* * * * *